March 18, 1958 P. W. JOHNSON 2,826,821
GAGE STUD AND GAGE
Filed Aug. 6, 1948
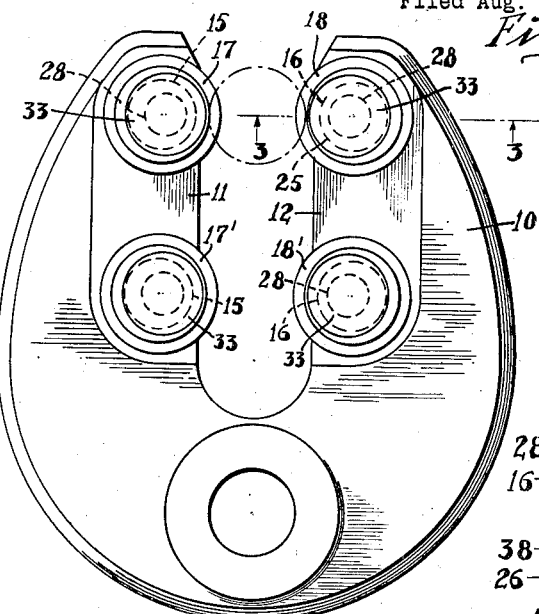
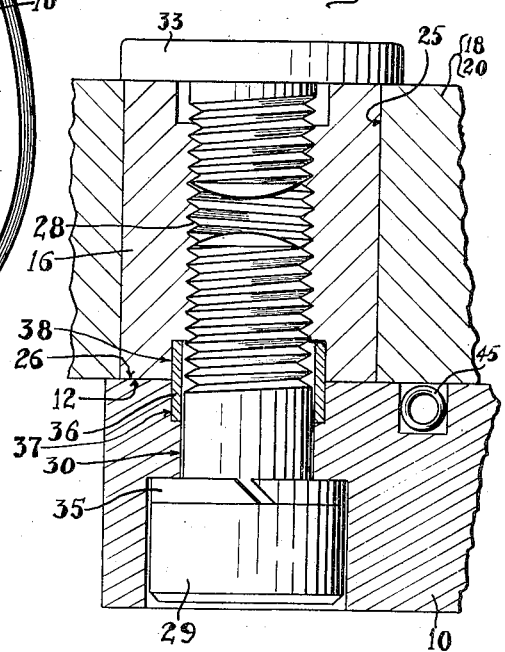
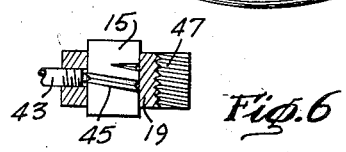
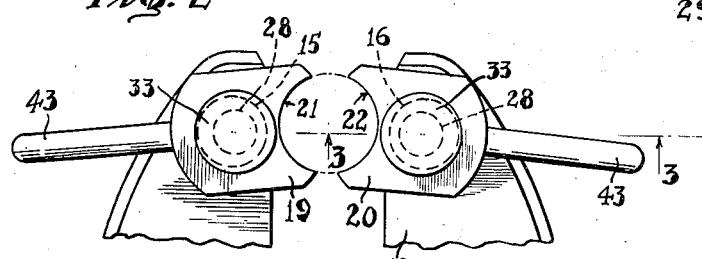
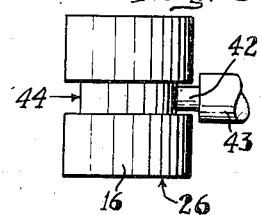
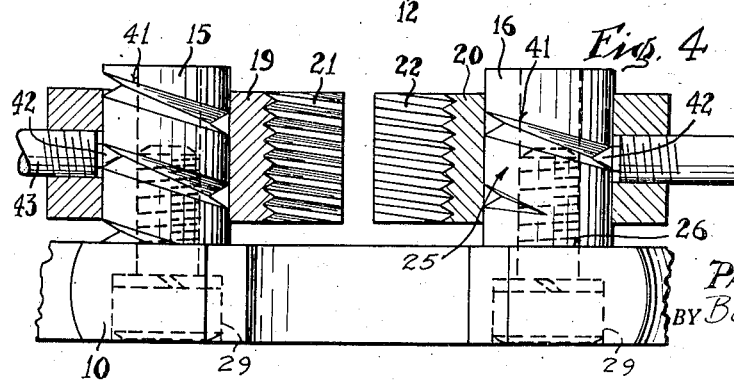
INVENTOR.
PAUL W. JOHNSON
BY Bohleber, Fassett &
Monstream
ATTORNEYS United States Patent Office 2,826,821
Patented Mar. 18, 1958

2,826,821

GAGE STUD AND GAGE

Paul W. Johnson, Bloomfield, Conn., assignor, by mesne assignments, to The Johnson Gage Development Company, a corporation of Connecticut Application August 6, 1948, Serial No. 42,881

20 Claims. (Cl. 33—199)

The invention relates to a gage or like device having accurately mounted elements utilizing a new and novel stud and frame construction for mounting each gage member which may be of the roll or segment type. As a sub-combination and an article of manufacture the invention also relates to the stud. Included in the invention is means for axially moving a segmental gage member or members in accordance with the pitch of the test thread or worm which also serves to retain the gage member upon the stud.

Heretofore studs for mounting gage members upon a frame have had two or more diameters one of which is received in the mounting frame. Both diameters must be accurately ground as to their individual diameters and alignment and also the holes in the frame which receive one of the stud diameters must be accurately dimensioned and also the axis must be accurately parallel with that of the stud of the cooperating gage member. As a consequence of these manufacturing difficulties, studs heretofore have not been able to be assembled indiscriminately or interchangeably but must be selectively assembled because of the practical difficulties in accurately holding each of the three dimensions to size. Furthermore, it is not easy to grind two diameters on a stud because of the shoulder between the two diameters. The stud of the invention has a ground bearing surface without a shoulder; hence it is easily and cheaply manufactured and ground and interchangeability is readily achieved.

It is an object of the invention to construct a gage with a frame and a stud for mounting a gage member which stud has a bearing surface without a shoulder and has an accurately squared end which contacts a flat surface on the frame for obtaining axial parallelism between two or more gage members or studs. The stud may have one diameter throughout its length which is the bearing surface for receiving a gage member.

Another object of the invention is to construct a stud for a gaging member and the like which has one accurately dimensioned bearing surface of maximum diameter and has at least one accurately squared end for obtaining parallelism between two or more gage members or two or more studs used for carrying gaging members or the like. The cylindrical bearing surface and the squared end both preferably have no projections or shoulders so that grinding thereof is simplified.

Another object of the invention is to construct a gage utilizing pivoted segmental gaging members at least one of which members is given axial movement as it or they pivot in order to maintain the gage member in proper axial relationship with the test thread or worm as it is moved laterally between the gage members.

Other objects of the invention will be more apparent from the following description when taken in connection with the accompanying drawing illustrating several embodiments of the invention in which:

Figure 1 is a front elevation of a tolerance gage having gaging members of the roll type and showing "go" and "no-go" gaging means;

Figure 2 is a partial view of a gage of the segmental type showing a single pair of pivoted gaging segments;

Figure 3 is a section through the gage and particularly through the stud taken on line 3—3 of Figures 1 or 2;

Figure 4 is a partial section through a gage having gage members or gaging means of the pivoting segmental type having threaded or worm gaging surfaces showing means for retaining the segment upon the stud and also for positively moving a segment axially as it pivots;

Figure 5 is a plan view of a stud with a merely circumferential groove; and

Figure 6 is a view of a stud and section of a gage segment having a groove in one stud only.

The stud, in having the maximum diameter forming the sole cylindrical bearing surface to be accurately ground, can be made heavier and cheaper and it involves a simple screw machine job to manufacture it as to rough form. A centerless grinding operation is all that is necessary in order to finish the cylindrical bearing surface. The stud is much easier to control for size, straightness and roundness. It is also easier and cheaper to obtain squareness of an end face of the stud with respect to the cylindrical bearing surface than to maintain bore size and axial parallelism of holes in the frames as heretofore used with studs having two different diameters namely a bearing for the gage member and a bearing received in a frame hole.

The gage includes a frame 10 of any suitable construction, that illustrated being of general U-shaped form. Surface means is provided upon the frame which may be a pair of elevated bosses or flats 11 and 12 on each arm of the U-shaped frame. It is to be understood, however, that if a U-shaped frame is not used the surface means may be a single surface. The surfaces 11 and 12 are accurately finished or ground so that they are in the same plane or may be in parallel planes, the point being, however, that they must be accurately parallel. The surface means may be provided by merely finishing accurately the faces of the U-shaped arms of the frame as shown in Figure 2.

The gage may be constructed with a gage member carried upon the stud to be described herein which gage member cooperates with another gage member of any suitable kind. The usual construction, however, is to use two or more like or similar gage members and mountings. The gage shown is of the tolerance type having one pair of studs 15 and 16 carried on the frame and a gage member is mounted upon each stud. The cooperating gage members 17 and 18 are rollers and for gaging a screw thread the rollers may be ribbed or screw threaded in order to gage a test thread. The "no-go" pair of gage members 17' and 18' may be pitch diameter gage members each mounted upon a stud. In Figure 2 the gage members 19 and 20 are of the segmental type having concave gaging surfaces 21 and 22 respectively or equivalent gaging means as described in the Johnson Patent 2,433,516. For gaging a plain cylindrical surface, the surfaces 21 and 22 should be cylindrical surfaces, whereas for gaging a thread or a worm, the gaging surfaces should be threaded. The thread forming the threaded concave gaging surface necessarily matches that of the test part or is of the same hand, that is for a right hand threaded test part the thread of the gaging surface is also right hand.

The details of the stud are illustrated in Figure 3. The stud 16 has a cylindrical bearing surface 25 which is the maximum diameter of the stud and the surface is basically cylindrical in that it may be plain or grooved. In the stud shown, this surface extends throughout the length thereof and there are no shoulders having a greater diameter or extending therebeyond. This surface is ground accurately to size, straightness and roundness and since there are no shoulders extending thereabove or of greater diameter it is an easy grinding operation which can be performed at low cost with a centerless grinder. At least one face 26 is accurately squared with respect to the cylindrical surface 25 or the axis thereof so that when the stud is clamped against the surface 12 of the frame and a second like stud 15 is also clamped against its surface 11, the cylindrical surfaces and the axes thereof are in accurate parallel relationship.

Any suitable means may be utilized for clamping a stud against its cooperating surface on the frame. The securing means may include a hole in and preferably through the stud. The simplest form of securing means which is that illustrated is a threaded hole 28 which receives a threaded screw or bolt 29 which is received in a hole 30 through the frame 10. The hole 28 in the stud and the hole 30 in the frame need not be of accurate size nor closely in alignment with its companion hole because parallelism between the two studs is obtained by the squared ends 26 of each pair of studs engaging their surface means 11, 12. Preferably the hole 28 in at least one stud is eccentrically located with respect to the cylindrical surface 25 so that by turning the stud on the screw 29, the spacing between gage members may be adjusted as desired.

Any form of means may be utilized in order to retain a gage member 18 or 20 upon the stud. In the construction shown in Figure 3 the retaining means is a headed screw 33 which is received in the thread hole 28. The head of the screw extends beyond the cylindrical surface 25 of the stud, or at least some portion thereof, so that the gage member is retained thereupon against axial removal. The stud of the invention has a further advantage in that it is an easy matter to remove one gage member from the stud and mount a second gage member of different size or characteristics, such as thread pitch, thereupon simply by removing the screw 33, axially sliding the gage off of the stud and mounting a second gage member thereupon. The hole at the square end of the stud for the securing screw 29 and the hole at the other end of the stud for the retaining means screw 33 provides hole means irrespective of whether or not it is a single hole extending through the stud as particularly illustrated.

Preferably, means are provided to create a tension or drag upon the stud so that when the clamping screw 29 is loosened somewhat for adjustment, the stud remains in adjusted position when the screw is again tightened. This may be accomplished by a split spring lock washer 35 between the head of the screw 29 and the countersunk shoulder. Such a washer provides a variable drag because if the screw 29 is loosened too much, there may be little or no drag between the face 26 of the stud and the surface 12. A split spring drag washer 36 may be provided if desired which bears against a surface 37 in the frame and a surface 38 on the stud. This spring washer will always establish a drag upon the stud irrespective of how much the screw 29 is loosened.

Another method of retaining a gage member upon the gage stud is illustrated in Figure 4 which means includes a groove 41 carried by one of the members including the gage member or the stud and shown particularly as being in the cylindrical surface 25 of the stud. A pin 42 carried by the other member or particularly the gage member 20 is received in the groove. The pin 42 may be any pin, however, it is shown as part of the handle 43 provided for pivoting the segmental gage member. The groove may be merely circumferential as the groove 44 of Figure 5 and when the pin 42 is received therein the gage member is held thereon against axial removal. If the groove is merely circumferential then the gage member maintains its axial position upon the stud. For gaging screw threads, however, with one or a pair of pivoting segmental gaging members as shown in Figure 2, one or both gaging members may have an axial movement or float, and particularly with steep angled threads such as the acme or a square thread and also particularly with respect to multiple threads or a so-called multiple start thread. Such axial float may be provided with the groove 44 and pin 42 merely by providing a groove wider than the pin dimension.

In the construction illustrated in Figure 4, an additional and desirable function is secured. A groove 41, shown in the bearing surface of the stud, is spiral and when such a groove is provided for each stud, it will have a pitch corresponding to the thread in the gaging surface 22 and of the test part. The segmental gage members or gaging means 19 and 20 of Figure 4 are shown with a triple thread or a three start thread and therefore the groove 41 corresponds therewith and has a pitch corresponding to that of a triple thread. As the segmental gage member or gaging means pivots on the stud, the pin 42 rides in the groove 41 and shifts the gage member axially corresponding with the pitch of the thread or worm of the test part.

The advantage of a spiral groove construction will now be explained. Heretofore one or both gage members had axial float upon the stud, for steep angle threads and multiple threads, and adjusted itself axially by engagement with the thread of the test part as the gage member pivoted with the lateral passing of a test part therebetween. As a consequence if there were a staggered or drunken thread, the gage member could and would many times adjust itself to this stagger and it might not be revealed with a free axially floating gage member. The same result could occur for a thread of faulty pitch. With the synchronized or controlled axial movement of the gaging member, however, the test part in passing between the gaging segments would bind for such a staggered or faulty pitch thread so that the test part would not pass through or would require pressure to pass it through and thereby reveal its fault. The gage therefore provides a positive test for this type of thread fault which might not be revealed by a gage member having a freely axially floating mounting upon the stud. The spiral groove and pin therefore serves a double function, namely it retains the gaging member upon the stud against axial removal and also synchronizes or enforces the proper amount of axial shift of the gaging member for the particular thread or worm being tested.

Each of the studs is shown as carrying a synchronizing groove 41 and hence each segmental gaging member is given an axial movement in opposite directions as they pivot with a test part received between the gaging surfaces. With this construction one stud may be eccentrically mounted upon its bolt 29 for adjusting the spacing between a pair of gage members and the other is concentrically mounted for adjustment of the cooperative relationship of the grooves 41.

A groove may be provided in one of the members, such as shown in Figure 6, namely the segmental gaging member or the stud, and the other gaging member retained upon the stud without axial movement with a mounting such as illustrated in Figure 3 or with a groove which is merely circumferential and without axial float. In such case the spiral groove 46 will have a pitch which is twice that of the test thread or worm 47, shown as a single thread, in order to synchronize the axial movement of the gaging member with the pitch of the test part. The stud for the axially fixed gaging member may be eccentrically mounted for adjusting the spacing between gaging members and the other stud may be adjusted for proper cooperative relation of the gaging member and the groove. It will be observed therefore that the synchronizing groove has a pitch the same as that of the thread of the gaging surface when a groove is provided in each stud which is a proportionality of one and when a synchronizing groove is provided for one segment alone the pitch is twice that of the thread of the gaging surface or a proportionality of two.

The groove 41 and pin 42 is illustrative of any means to give the gage member an axial movement upon the pivot means in prescribed or fixed relation with respect to the spiral or thread of the test part to be gaged. The means includes cooperating parts, one carried by a stationary part of the gage shown particularly and preferably only as the pivot means or stud and the other carried by the pivoting gage member. When a groove is used, it has an angle or inclination corresponding to the pitch of the thread or worm to be tested when both gaging members are axially moved or having a pitch or inclination of twice the pitch of the test part if a groove is provided in one stud alone. The groove is in effect and operation, a cam or inclined plane means which moves the pivoted gaging member axially in synchronized, prescribed or predetermined relation with the pitch or twice the pitch of the spiral or thread of the test part or of the spiral or thread in the concave gaging surfaces 21 and 22. The groove also is of a reverse or opposite spiral or helix from that of the test part; for example, if the test thread is right hand, then the groove is or the grooves are left hand. The means for giving enforced axial movement of the pivoted gage member need not be associated with the stud described herein, however, when used with such stud it serves the double function of providing axial movement and retaining the gaging member upon the stud against axial removal.

Means may be provided to propel the segmental gage member towards either gaging or open position. A spring 45 may be used for this purpose and is merely indicative of any suitable means shown in my prior applications. The pivotal segmental gage members may pivot through the point of nearest approach which is on a line between the centers of the studs or they may pivot to or short of this line.

In all of the studs, the outer bearing surface is at least basically cylindrical. The stud of Figure 3 has an outer bearing surface which is completely and solely cylindrical. In the studs of Figures 4 and 5 the outer bearing surface is cylindrical in that the bearing surface itself is cylindrical in general form and in addition has a groove added to or depressed into the stud from the bearing surface and therefore the bearing surface is basically cylindrical irrespective of the surface area which is cylindrical and a bearing surface as compared to the grooved area. A stud having a bearing surface which is at least basically cylindrical defines, therefore, the plain surfaced stud of Figure 3 as well as the grooved studs of Figures 4 and 5. Such groove does not interfere with nor alter in the slightest the cylindrical grinding step in the manufacture of the stud as referred to herein. By a like definition the basic diameter is that of the basic cylinder.

This invention provides an improvement in a stud and a device requiring accurate mounting of the elements thereof with respect to each other such as gage members. It is understood that various modifications in structure, as well as changes in mode of operation, assembly, and manner of use, may and often do occur to those skilled in the art, especially after benefitting from the teachings of an invention. This disclosure illustrates the preferred means of embodying the invention in useful form.

What is claimed is:

1. A gage comprising a frame, a pair of cooperating gaging means including at least one segmental gage member having a threaded concave gaging surface in which the thread matches that of a perfect test part, pivot means carried by the frame pivotally mounting each segmental gage member at a point spaced from the concave gaging surface and the axis thereof, and means to move the segmental gage member axially on the pivot means as the gage member pivots thereon in proportion to the pitch of the thread in the concave gaging surface, the means to move a gage member axially of the pivot means being a cam means positively moving the gage member in both directions and of reverse helix relative to that of the thread of the concave gaging surface, the cam means being carried by one of the members including the gage member and a stationary member of the gage, and a cooperating means engaging the cam means carried by the other member.

2. A gage comprising a frame, a pair of cooperating gaging means including at least one segmental gage member having a threaded concave gaging surface in which the thread matches that of a perfect test part, pivot means carried by the frame pivotally mounting each segmental gage member at a point spaced from the concave gaging surface and the axis thereof, and means to move the segmental gage member axially on the pivot means as the gage member pivots thereon in proportion to the pitch of the thread in the concave gaging surface, the means to move a gage means axially being a groove in one of the parts including the gage member and the pivot means and cooperating means engaging the groove carried by the other part, the groove having a helix which is the reverse of the helix of the thread on the concave gaging surface.

3. A gage comprising a frame, a pair of cooperating gaging means including at least one segmental gage member having a threaded concave gaging surface in which the thread matches that of a perfect test part, pivot means carried by the frame pivotally mounting each segmental gage member at a point spaced from the concave gaging surface and the axis thereof, and means to move the segmental gage member axially on the pivot means as the gage member pivots thereon in proportion to the pitch of the thread in the concave gaging surface, the means to move a gage member axially being a groove in the pivot means, and a cooperating groove engaging means carried by the gaging means, the groove having a helix which is the reverse of the helix of the thread on the concave gaging surface.

4. A gage comprising a frame, a pair of cooperating gaging means including at least one segmental gage member having a threaded concave gaging surface in which the thread matches that of a perfect test part, pivot means carried by the frame pivotally mounting each segmental gage member at a point spaced from the concave gaging surface and the axis thereof, and means to move the segmental gage member axially on the pivot means as the gage member pivots thereon in proportion to the pitch of the thread in the concave gaging surface, the means to move the gage member axially including a groove in each pivot means having a pitch corresponding to that of the thread of the concave gaging surface, the groove having a helix which is the reverse of the helix of the thread on the concave gaging surface.

5. A gage comprising a frame, a pair of cooperating gaging means including at least one segmental gage member having a threaded concave gaging surface in which the thread matches that of a perfect test part, pivot means carried by the frame pivotally mounting each segmental gage member at a point spaced from the concave gaging surface and the axis thereof, and means to move the segmental gage member axially on the pivot means as the gage member pivots thereon in proportion to the pitch of the thread in the concave gaging surface, the means to move the gage member axially including a groove solely in one pivot means having a pitch twice that of the thread of the concave gaging surface, the groove having a helix which is the reverse of the helix of the thread on the concave gaging surface.

6. A stud for a gage member and the like comprising a stud having an outer bearing surface which is at least basically cylindrical and of one basic diameter throughout its length, the bearing surface being accurate as to size, at least one flat end for the stud accurately squared with respect to the outer bearing surface, the stud having hole means at each end thereof, and the hole means having screw threads to receive a securing screw at one end and a screw for a retaining means at the other end to retain a member on the stud against axial removal from the end thereof.

7. A stud for a gage member and the like comprising a stud having an outer bearing surface which is at least basically cylindrical and of one basic diameter throughout its length, means carried by the stud for retaining a member thereon against axial removal from one end thereof, at least one flat end for the stud accurately squared with respect to the outer bearing surface, and the stud having a hole extending from a squared end thereof, the hole in the stud being eccentric with respect to the outer bearing surface.

8. A stud for a gage member and the like comprising a stud having an outer bearing surface which is at least basically cylindrical and of one basic diameter throughout its length, means carried by the stud for retaining a member thereon against axial removal from one end thereof, at least one flat end for the stud accurately squared with respect to the outer bearing surface, and the stud having a hole extending from a squared end thereof, the hole extending through the stud and is threaded, and the retaining means includes a screw received by the threads in the hole and carries a head extending beyond the outer bearing surface of the stud.

9. A stud for a gage member and the like comprising a stud having an outer bearing surface which is at least basically cylindrical and of one basic diameter throughout its length, means carried by the stud for retaining a member thereon against axial removal from one end thereof, at least one flat end for the stud accurately squared with respect to the outer bearing surface, and the stud having a hole extending from a squared end thereof, and a spiral groove in the outer bearing surface thereof having a pitch proportional to a screw thread pitch.

10. A gage comprising a frame, surface means carried by the frame including one or more surfaces one being accurately in the same plane or a parallel plane with respect to the other, at least one pair of studs for the surface means and each having a single bearing surface which is at least basically cylindrical and of one diameter, means carried by the gage for retaining a gage member on the stud against axial removal from one end thereof, at least one flat end for each stud accurately squared with respect to its cylindrical surface, the frame having a hole therethrough at the surface means for each stud, means for each stud received in the hole in the frame for securing each stud with a squared end against the surface means, and a gage member carried on the cylindrical surface of each stud, and having a bearing therefor, and the bearing surface of each stud, at least one squared end of each stud, the bearing of the gaging member, and the surface means being the sole elements finished accurately with respect to dimension and each other.

11. A gage as in claim 10 in which the stud securing means is eccentric with respect to the cylindrical surface.

12. A gage as in claim 10 in which the surface means includes two spaced surfaces in the same plane, and a gage stud being secured to the frame and against each surface.

13. A gage as in claim 10 including a cylindrical surface carried by the stud and a cylindrical surface carried by the frame, and a resilient member engaging both cylindrical surfaces to retain the stud in adjusted position.

14. A gage as in claim 10 in which the retaining means includes a groove in the stud extending circumferentially and a pin carried by the gage member engaging in the groove.

15. A gage as in claim 10 in which at least one gage member is a pivoted segmental threaded member, and synchronizing means carried by the stud and segmental gage member to move the latter axially on the stud as it pivots thereon.

16. A gage as in claim 10 in which at least one gage member is a pivoted segmental member having a threaded gage surface, a spiral groove carried by one of the members including the stud and the gage member which spiral is in a reverse direction from that of the thread of the gage member, and a pin carried by the other member engaging in the groove to move the gage member axially on the stud as the former pivots.

17. A gage as in claim 10 in which each gage member is a pivoted segmental member having a threaded gaging surface, a spiral groove carried by each stud which spiral is in a reverse direction from that of the threaded gaging surface.

18. A gage as in claim 10 in which each gage member is a pivoted segmental member having a threaded gaging surface, means retaining one gage member against axial movement, upon its stud, a spiral groove carried by the other stud, a pin carried by the gage member engaging in the spiral, and the spiral of the groove being in a reverse direction from that of the threaded gaging surface and having a pitch twice that of the latter.

19. A device having members accurately mounted with respect to each other comprising a frame, surface means carried by the frame including one or more surfaces one accurately in the same plane or a parallel plane with respect to the other, at least one pair of studs for the surface means and each having a single bearing surface which is at least basically cylindrical and of one diameter, means carried by the frame for retaining a member on the stud against axial removal from one end thereof, at least one flat end for each stud accurately squared with respect to its bearing surface, the frame having a hole therethrough at the surface means for each stud, means for each stud received in the hole in the frame for securing each stud with a squared end against the surface means, and a member carried on the cylindrical surface of each stud and having a bearing therefor, and the bearing surface of each stud, at least one squared end of each stud, the bearing of the member, and the surface means being the sole elements finished accurately with respect to dimension and each other.

20. A gage comprising a frame, surface means carried by the frame including one or more surfaces one accurately in the same plane or a parallel plane with respect to the other, at least one pair of studs for the surface means and each having a single bearing surface which is cylindrical and of one diameter throughout its length, means carried by the gage for retaining a gage member on the stud against axial removal from one end thereof, at least one flat end for each stud accurately squared with respect to its cylindrical surface, the frame having a hole therethrough at the surface means for each stud, means for each stud received in the hole in the frame for securing each stud with a squared end against the surface means, and a gage member carried on the cylindrical surface of each stud, and having a bearing therefor, and the bearing surface of each stud, at least one squared end of each stud, the bearing of the gaging member, and the surface means being the sole elements finished accurately with respect to dimension and each other.

References Cited in the file of this patent

UNITED STATES PATENTS

| | | |
|---|---|---|
| 1,096,511 | Lightle | May 12, 1914 |
| 1,613,824 | Hanson | Jan. 11, 1927 |
| 1,908,253 | Johnson | May 9, 1933 |
| 1,925,346 | Summers | Sept. 5, 1933 |
| 1,930,558 | Johnson | Oct. 17, 1933 |
| 2,022,089 | Pond | Nov. 26, 1935 |
| 2,367,255 | Aller et al. | Jan. 16, 1945 |
| 2,433,516 | Johnson | Dec. 30, 1947 |
| 2,437,160 | Johnson | Mar. 2, 1948 |

FOREIGN PATENTS

| | | |
|---|---|---|
| 135,787 | Great Britain | June 6, 1919 |
| 574,307 | Germany | Apr. 12, 1933 |
| 224,233 | Switzerland | June 1, 1943 |
| 594,890 | Great Britain | Nov. 21, 1947 |
| 602,740 | Great Britain | June 2, 1948 |